United States Patent [19]

Polyakov et al.

[11] 3,755,885
[45] Sept. 4, 1973

[54] METHOD OF FORMING A SEALING COATING ON A METALLIC MEMBER

[76] Inventors: Georgy Filippovich Polyakov, ulitsa Akademicheskaya, 23, kv. 8; Vladimir Lvovich Vanin, ulitsa Gogolya, 31, kv. 35; Vladimir Alexandrovich Kamardin, ulitsa Dachnaya, 25, kv. 71, all of Novosibirsk, U.S.S.R.

[22] Filed: Jan. 3, 1972

[21] Appl. No.: 214,953

Related U.S. Application Data

[62] Division of Ser. No. 887,222, Dec. 22, 1969, Pat. No. 3,655,209.

[30] Foreign Application Priority Data

Feb. 20, 1969    USSR..........................1300958

[52] U.S. Cl...................... 29/494, 29/484, 29/497, 117/131
[51] Int. Cl...................... B23k 31/02, B23k 35/38
[58] Field of Search..................... 29/494, 497, 484; 117/131

[56] References Cited
UNITED STATES PATENTS
3,393,445   7/1968   Ulam ............................... 29/494 X

OTHER PUBLICATIONS

A Dictionary of Metallurgy, page 59.

The Welding Encyclopedia, pages 689–690.

Primary Examiner—J. Spencer Overholser
Assistant Examiner—Richard Bernard Lazarus
Attorney—Eric H. Waters, John G. Schwartz et al.

[57]   ABSTRACT

A hermetic sealing coating is formed on a surface of a metallic element to be brought into sealing contact with another element by pressing the first element against a metal member in a vacuum at a pressure and temperature to ensure molecular diffusion cohesion of the metal of the first element with the metal of the contacting member whereafter the two are parted. The procedure is repeated until a finely dispersed layer is formed on the surface of the metallic element.

5 Claims, 4 Drawing Figures

METHOD OF FORMING A SEALING COATING ON A METALLIC MEMBER

CROSS RELATED APPLICATION

This Application is a division of our earlier application Ser. No. 887,222 filed Dec. 22, 1969 and issued as U.S. Pat. No. 3,655,209 on Apr. 11, 1972.

BACKGROUND OF THE INVENTION

1. Field of the Invention

The present invention relates to methods of forming a hermetically sealing coating on sealing members.

The present invention may be utilized for hermetically sealing devices operating under conditions of vacuum or high pressure which are frequently opened and closed.

Devices employing the inventive sealing members may be used in the electronic and radio industries, vacuum and space engineering, nuclear and semiconductor physics, and for widely varied technological and scientific-research instruments.

2. Description of the Prior Art

Presently known are metallic sealing members for openable devices which operate under conditions of vacuum or very high pressure.

The prior art sealing members differ from each other in the design of their contacting surfaces, the type of connection (detachable or permanent), and the method of hermetic sealing.

The metallic sealing members used in vacuum and pipe-line engineering are essentially sealing surfaces with cavities or bosses provided on the valves and seats of the locking devices, or sealing surfaces with cavities and bosses provided on the flanges and pipes of the coupling devices, as well as various types of packings disposed between the sealing members, and usually made from a metal which is softer than that of said sealing members.

Permanent joints are hermetically sealed by means of soft or hard soldering and through various types of welding. Though they attain a high degree of hermetic sealing, heat resistance and mechanical strength, such packings are inconvenient in use due to difficulties encountered during assembling and dismantling.

In accordance with another method of hermetic sealing, the sealing members may be metallic packings made from a material having a low yield point, such as gold, copper, nickel, soft iron, or aluminum. Under the action of considerably great forces of compression, exerted by the elements of the sealing joint, the packing is subjected to plastic deformation, as a result of which the material of the packing fills micro-cavities, scores and cracks to be found on the sealing surfaces. This method of hermetic sealing requires high-quality precision machining of the sealing surfaces and replacement of the sealing packing after dismantling. Furthermore, considerable mutual diffusion of the materials of the packing and sealing surfaces takes place when the sealing members are heated to remove a gas, which diffusion hampers dismantling of the connection and decreases the service life of the sealing members.

Furthermore, due to considerable strengthening of the sealing material under the action of the preliminary applied force of hermetic sealing, there are often encountered difficulties resulting from the necessity to develop high specific forces of hermetic sealing.

The afore-mentioned reasons hamper employment of sealing packings in frequently openable and closable devices being hermetically sealed, for instance, in high-vacuum valves, systems of vacuum sluicing, etc.

There are many known ways of overcoming the difficulties inherent in the method of hermetic sealing of openable connections by means of sealing packings.

In accordance with one of these methods, use is made of sealing members with a flat annular packing, provided with a groove-and-wedge profile, which makes it possible to substantially decrease the force required for the hermetic sealing by considerably decreasing the packing area subjected to deformation. In accordance with another method, use is made of opposite bosses of similar shapes and sizes, having a spherical or rectangular profile, which allows an increase in the hermetic sealing by increasing the contact area, and, finally, in accordance with a third method the sealing members are fashioned with conical or plano-parallel surfaces which in the course of compression deform a flat or wire annular packing disposed therebetween and, due to great friction forces, effect a plastic flow of the material of the packing and destruction of the surfaces of any oxide film. The resultant cold local welding of clean metallic surfaces which takes place at this time is used for improving the hermetic sealing of the connection.

However, the above-mentioned constructive ways of solving the problems of making a reliable sealing to be heated and used for locking and detachable connections, as well as many other methods of hermetic sealing envisaging the use of, for example, packings having a certain predetermined profile with stepped sealing surfaces, or packings fashoned as multi-layer structures (in order to decrease the hermetically sealing loading, or to raise their chemical or thermal resistance), do not make it possible to obtain the essential technical characteristics which are necessary for their multiple use, for instance, during multiple cycles of heating and cooling.

Use of conventional diffusion or powder packings which are adapted to obtain a high degree of hermetic sealing but can be used only in static vacuum plants or instruments, which are seldom dismantled, also fail to provide the necessary technical effect.

Particularly strict requirements are set forth with respect to heated multiple locking devices, for example, high-vacuum valves which are to sustain multiple cycles of heating and cooling, opening and closing without replacement of the sealing member and decrease of the hermetic sealing and increase of gas separation, one of the primary requirements in this case being the restoration of the mutual position of the sealing members of the locking unit and preservation, and at the same time, maintaining a constant force of hermetic sealing.

Conventional multiple locking devices are sealed at the expense of plastic deformation or by means of the material of the locking member (plate) or the seat, and, therefore, the sealing joint is made from material which sharply differ in their hardness. For example, the seat may be made from steel and the valve made from aluminum, copper or silver, or vice versa. To provide for their ready manufacture, they are formed as bodies of revolution whose shape attributes to crushing or cutting-off of the softer material during subsequent sealing (wearing). A disadvantage of such constructions is that the parts of the locking member do not preserve their mutual position during the course of operation, or the force of hermetic sealing increases and is accompanied by an increased inflow through the contact surfaces of the locking member.

Also known in the art are multiple locking devices employing flat annular or profiled, for example, toroidal, metallic sealing packings. In some cases, for example, in order to increase their thermal or chemical resistance, or to decrease the hermetically sealing loading, such packings are made as multilayer structures. However, they have a short service life and possess a number of the disadvantages inherent in the above-mentioned sealing members of openable devices to be hermetically sealed.

Thus, among the main disadvantages of conventional frequently openable and closable devices are the following: impossibility to provide a mutual disposition of the parts of the locking member in the course of operation, an increased force of hermetic sealing accompanied by an increased inflow through the contact surfaces of the locking member (i.e. deterioration of the hermetic sealing, destruction or wear of the contact surfaces of the sealing members) and, as a result of the foregoing a short service life.

SUMMARY OF THE INVENTION

An object of the present invention is to provide a method of forming on such metallic sealing members a metallic hermetically sealing layer which provides a greatly improved hermetic sealing of frequently openable and closable devices in the course of their repeated use.

The above and other objects are accomplished by application, on a metallic sealing member for openable devices operating under conditions of vacuum or extremely high pressure, of a coating which, according to the invention is a hermetically sealing coating essentially constituted as a finely dispersed metallic layer whose yield strength is lower than that of the sealing member proper.

In accordance with the present invention the hermetically sealing coating is formed on metallic sealing members in the following manner: one of the sealing members, essentially a metallic packing, is disposed between two other sealing members which are movable relative to each other and which contact the packing, all the three sealing members being placed in vacuum, the packing is then compressed by said movable members and they are maintained under vacuum for a certain period of time, the force of compression and the temperature being chosen such as to provide for a molecular-diffusion cohesion of the metal of the packing with the metal of the contacting surfaces of said movable members then, at least one of the movable sealing members is moved away and actually torn from said packing. The entire cycle is repeated several times until a finely dispersed metallic layer is formed both on the contacting surface of the packing at the side where said movable member was moved, and on the surface of the movable member which contacted said packing.

If no packing is to be used in the joint, the hermetically sealing metallic layer may be formed on the contacting surfaces of the sealing members directly from the materials of the latter by their repeated pressure contact and separation in a vacuum, for a certain period of time, the force of compression and temperature being chosen to provide for molecular-diffusion cohesion of the metal of the surfaces of both sealing members.

It is expedient to fashion the locking device, preferably a vacuum valve, in such a manner that the contacting surfaces of its sealing members have a hermetically sealing metallic layer.

The following description of exemplary embodiments of the present invention is given with reference to the accompanying drawings.

DETAILED DESCRIPTION

Figure 1:
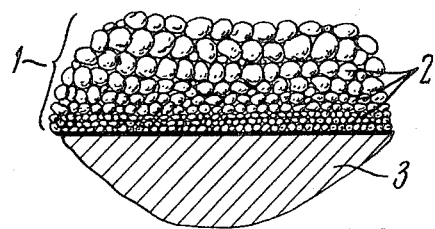
FIG. 1 shows in longitudinal section an enlarged view of the structure of the metallic hermetically sealing layer formed on a sealing member, according to the invention.

The present invention is directed to an improved method of hermetic sealing of frequently openable sealing device, characterized in that a metallic hermetically sealing coating (layer) in the form of a granular finely dispersed structure is formed on the contacting surfaces of the sealing members, the granules of said structure having different sizes and shapes and being in cohesion with each other and with the contacting surfaces of the sealing members through molecular-diffusion forces.

This layer is characterized by a variable yield strength which is minimal on the surface and maximal in the depth of the layer, for example at the point of its contact with the underlying material of the sealing member.

At the same time, the material of the sealing member on whose contacting surface the hermetically sealing layer is formed, must possess a yield strength equal to or exceding the maximum yield strength of the material from which the hermetically sealing layer is formed, the thickness of the layer being chosen depending on its yield strength and the specific loading of the hermetic sealing.

It has been found that mutual compression of two clean metallic surfaces made, for instance, of the same metal, with the specific forces of compression being sufficiently great, results in their complete cohesion and formation of a single crystal grating even at a low temperature. This process is known as cold welding of metals.

It is also known that with two heterogenous metallic surfaces contacting each other and heated to a certain temperature (of the order of 0.7–0.8 of the lower of the melting points of the two metals), there appears mutual diffsuion, which, in the long run, results in diffusion welding. The diffusion welding may take place, for instance, between gold and copper, copper and stainless steel, iron and aluminum, etc.

Both the cold and diffusion welding processes are used for making hermetically sealing packings in permanent connections. The process of formation of a monolithic piece of metal consisting of similar or heterogenous metals, taking place in hard-to-dismantle connections thus obtained, may develop to such an extent that the drawing-apart of the connected surfaces will result in their breakage so that each of the surfaces will have pieces of the metal from the opposite surface, welded thereto. This phenomenon is considered to be undesirable as it prevents the repeated use of the sealing packings.

In accordance with the present invention, the phenomenon of the cold or diffusion welding is used for forming and shaping a metallic hermetically sealing layer on the contacting surfaces of sealing members. This is accomplished by placing the sealing members with cleaned (for example, washed with organic solutions or distilled water, chemically or ionically pickled, electrically polished, etc.) surfaces in a vacuum, additionally cleaning them by heating (preferably to a temperature at which decomposition of the surface oxides takes place), mutual compression of their contacting surfaces with a force dependent on the materials used, the area of contact and the temperature of the contacting surfaces maintaining them for a certain period of time under the action of a preset force of compression and a preset temperature, drawing them apart until the contacting surfaces are completely disengaged from each other, and repeating the steps of mutual compression and drawing-apart several times until a finely dispersed metallic hermetic sealing layer is formed on the contacting surfaces of the sealing members. The aforedescribed cycle may be effected by tearing from the packing only one sealing member.

Commencing with the first mutual compression of the sealing members, when they are being maintained under the action of a predetermined force of compression and a predetermined temperature, there takes place plastic deformation of microbosses and irregularities of the contacting surfaces, which is accompanied by destruction of surface films (for instance, oxide films, etc.). Concentration of forces on small areas of contact in separate small zones of the contacting surfaces provides conditions for cold or diffusion local welding. As has already been noted hereinbefore, the drawing-apart of the sealing members which have been subjected to sufficiently intensive compression causes each contacting surface to have pieces of the material of the opposite surface soldered or welded thereto. The size of these pieces which are of an irregular shape is from 1 micron to 1 mm.

In accordance with the conditions of the formation of the hermetically sealing layer, it is necessary to choose such a force of compression, temperature and time period during which the sealing members are kept compressed, depending on the materials used, cleanliness and method of treatment of the contacting surfaces, whereby the sizes of the pieces of the material transferred from one surface onto another are from 1 to 100 micron.

Generally speaking, the process of the transfer of the materials from one surface to another, taking place in a vacuum when the contacting surfaces are made from one and the same material, is symmetrical. With the processes of the mutual compression and drawing-apart repeated, due to natural small displacements of the surfaces relative to each other, the local welding takes place every time on new surface portions.

One and the same pieces of the materials may be transferred from one surface to the other several times. During the process, the contacting surfaces are mutually loosened, the tornup materials are mixed, and new portions of the surfaces are involved in the process until the contacting portions of the two surfaces are coated with a homogeneous, fine (10–400 micron), finely dispersed (the size of the granules varying from 1 to 100 micron) metallic layer. The structure of this layer is shown in FIG. 1, and it may be described as a metallic layer 1 of fine granules 2 in cohesion with each other and with the lower layers 3 of the metal of the sealing member on which it is formed by molecular-diffusion forces.

Simultaneously with the process of the formation of the above-described finely dispersed layer 1, there takes place deformation compression (cold working) of the material of the sealing members in the zones disposed under the contact surfaces. The process of the cold working substantially changes the mechanical properties of the metal: the metal hardness is sharply increased, as is the yield strength in correlation therewith.

Thus, the relatively fine structured (10–400 micron) finely dispersed metallic layer formed in the course of repeated compression and drawing-apart of the contacting surfaces of the sealing members, is disposed on much thicker layers of the metal having an increased hardness or an increased yield strength with the thickness of this layer varying and reaching an order of 1 mm depending on the shape of the sealing members, materials used and temperature.

The finely dispersed metallic layer formed in a vacuum on the contacting surfaces of the sealing members contains no oxide films or other impurities, and is essentially a fine-grained structure. As separate monolithic granules of the metal in this layer are in a relatively weak cohesion with one another (the area of the contact surfaces between adjacent granules may be much smaller than the total surface of granules), relatively small forces are required to displace granules relative to one another, to destroy old connections and form new ones. This layer is similar to a layer of sand in which, when glued, the grains can be easily displaced relative to one another without destroying the layer homogeneity.

When forming the afore-described layer in vacuum, original traces of treatment disappear from each of the contacting surfaces participating in the process, and they acquire a slightly uneven shape.

Thanks to its mechanical properties, low yield strength and high cohesion of the granules to one another in particular, as well as to a low gas permeability of its compressed material, the finely dispersed metallic layer may be used for hermetically sealing packing surfaces frequently closable and openable connections.

The present invention will become more apparent upon considering a description of a method of forming a metallic hermetically sealing layer on a copper wire used as a sealing member of extra-high vacuum metallic heated valves, and of steel sealing members operating together therewith.

Figure 2:
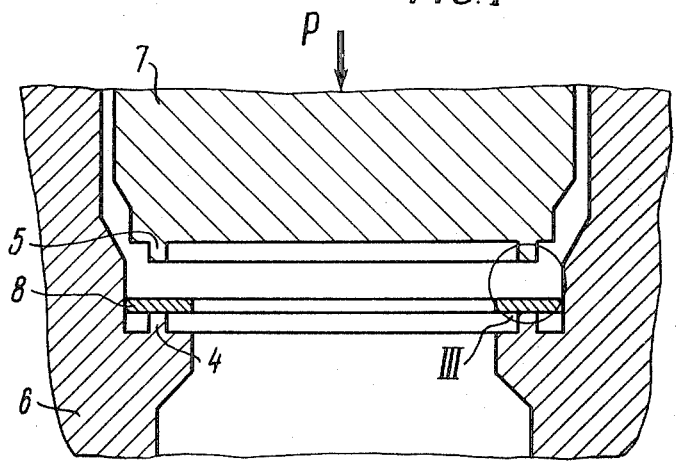
FIG. 2 is a longitudinal sectional view of a portion of a sealing device with a metallic packing disposed between the contacting surfaces of its sealing members.

The construction of the valve is illustrated in FIG. 2 showing annular sealing bosses 4 and 5 provided on a seat 6 and a locking member 7, respectively, and a flat annular gasket or sealing packing 8 disposed therebetween. The locking member 7 and the seat 6 may be made from steel, for example, stainless steel, in which case the sealing packing 8 is made from a technical or pure copper; in case it is to be used in extra-high vacuum valves, it is desirable to make the packing 8 from a vacuum or oxygen free copper.

The sealing packing 8 is subjected to technological treatment according to a conventional method.

The precise centering of the locking member 7 relative to the seat 6 is accomplished by coupling the outer diameter of the locking member 7 and the inner diameter of the seat 6 in accordance with allowances corresponding to a slidable fit. With the packing 8 secured in the seat 6 as shown in FIG. 2, either the outer diameter of the packing 8 or the inner diameter of the ring, which is coupled with the inner diameter of the seat 6 is selected to provide a free fit. In case the packing is secured on the locking member, it is the inner diameter of the packing that is chosen, which diameter is related to the outer diameter of the locking member in accordance with the free fit.

Figure 3:
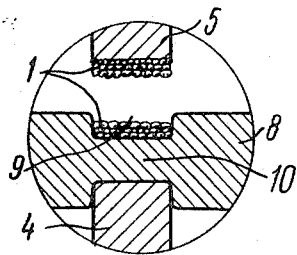
FIG. 3 is an enlarged view of detail III of FIG. 2.

When the packing 8 is compressed for the first time between the sealing bosses 4 and 5 of the seat 6 and the locking member 7, the bosses deform the soft packing 8 to form thereon sealing grooves 9 (FIG. 3) whose depth depends on the specific loading P (FIG. 2) and the original thickness of the packing 8.

Simultaneously with the formation of the sealing grooves 9 on the packing 8, there takes place an increase in its outer diameter, which makes it possible to tightly fix the packing 8 in the seat 6.

Under analogous conditions, if the packing 8 is fitted on the locking member 7, the inner diameter of the packing 8 decreases, which allows tightly fixing the latter on the locking member.

The afore-described method of mutual centering of the valve 7, seat 6, and packing 8 is necessary to ensure that, during the subsequent working cycles "compression - drawing apart - compression" the disengaged sealing boss 5 of the locking member 7 always arrives in the groove 9 formed in the packing 8 during the first act of compression.

In the course of the repeated working cycles "compression - drawing apart - compression", carried out in vacuum at an appropriately chosen temperature (ranging from room temperature to 300°–400°C) a metallic hermetic sealing layer 1 consisting of granules 2 of finely dispersed copper is formed on the contacting surfaces of the disengaged sealing boss 5 and the bottom of the respective sealing groove 9 of the packing 8 in accordance with the afore-described diagram.

Concurrently, in the course of the repeated processes of compression of the sealing packing 8 by the sealing bosses 4 and 5, there takes place compression of surface layers 10 of the packing 8 between the bosses 4 and 5, as a result of which the elastic limit increases to values characteristic of compressed copper that has undergone cold working, i.e. their yield strength is increased up to 34–38 kp/mm$^2$. At the same time, the hermetic sealing layer 1 remains capable of being plastically deformed under the action of specific loads beginning with approximately 5 kp/mm$^2$.

Since the specific load (5–20 kp/mm$^2$) necessary to cause the plastic deformation of the hermetic sealing layer 1 is much less than the elastic limit of the packing 8 as a whole (34–38 kp/mm$^2$), or at least on the middle layer 10 subjected to the loading P, the locking member of the valve, prepared in the afore-described manner, is capable of normal operation.

The movable sealing members of the valve are hermetically sealed in this case by the metallic hermetic sealing layer 1 formed from the packing 8, said layer 1 being disposed on the contacting surfaces of the sealing boss 5 and in the sealing groove 9 of the packing 8. The sealing boss 4 and the sealing groove 9 of the packing 8 are hermetically sealed along their detachably engageable surfaces by means of their vacuum-tight contact. By removing the packing 8, it can be seen that the surface of the sealing groove 9 which was in contact with the sealing boss 4 which was not drawn away contains no hermetic sealing layer 1, appears bright and precisely conforms to the profile of the respective surface of the sealing boss, whereas the surface of the groove which was in contact with the boss 5 which was moved away appears dull or slightly uneven, and does not conform to the profile of the surface of the boss.

In the course of normal operation of the above-described sealing unit of the valve, i.e. when the specific loads P acting upon the packing are within a range of 5–20 kp/mm$^2$, it preserves its properties as a hermetic sealing member, both in vacuum and under a pressure over indefinitely long periods of time, since during the successive compression and drawing-apart sequences of its movable parts, the hermetic sealing layer is self-restored (reproduced) on both contacting surfaces of the sealing members, which are moved relative to each other.

It is quite apparent that the initial cleanliness of the treatment of the surfaces of the packing and the sealing boss will predetermine the degree of the hermetic sealing, i.e. the value of the specific inflow of the unit as a whole, particularly so on the surfaces which provide for hermetic sealing only due to a vacuum-tight contact, i.e. on the surfaces of the bosses and the bottom of a respective groove that are not disengaged and where the diffusion cohesion of copper with steel is hampered by fine layers of oxides that have not been destroyed. Such surfaces must be free of transverse scores and scratches, and, when used in ultra high vacuum devices, transversely located worn-out portions. The initial cleanliness of the treatment of the surfaces of the sealing bosses to be used in the sealing units of extra-high vacuum valves should not be below the 7-8th grates.

The hermetic sealing and operating properties of the afore-described sealing unit for valves have been tested within a wide range of temperatures, and namely, from +600°C to −195°C. It has been found, as a result of these tests, that the value of the specific hermetically sealing force somewhat increases at low (nitrogen) temperatures and reaches 16–20 kp/mm$^2$ with T= −196°C; and decreases at higher temperatures, reaching the values of an order of 2–3 kp/mm$^2$ when T = +600°C, the hermetic sealing obtained at a temperature of −196°C being preserved approximately up to +500°C. This is explained by the fact that the coefficients of linear expansion of copper and stainless steel are almost equal within a range of temperatures from −196°C to +600°C, the insignificant difference between them being compensated by the plasticity of the hermetically sealing layer.

One of the advantages of the present invention is that in the afore-described modification the hermetically sealing layer is formed simultaneously on both contacting surfaces of the separable sealing members (the boss and the packing), which, with the design of the sealing unit being appropriately chosen, provides for self-restoration of the hermetically sealing layer and preservation of its properties in the course of operation. Results of the tests and use of the instant invention is experimental ultra high vacuum heated valves having a diameter of the inlet passage from 6 to 200 mm show that, with T=20°C, the durability of the sealing unit provided with the hermetically sealing layer exceeds 4,000–5,000 working cycles.

Another advantage of the present invention is that in the course of prolonged use, the seat and the locking member are restored to their mutual conditions. This restoration is charactierzed by a mutual axial displacement between the locking member and the seat, which takes place after 3,000 working cycles have been carried out at T=20°C, and with the extent of this displacement not exceeding 0.05–0.1 mm.

Figure 4:
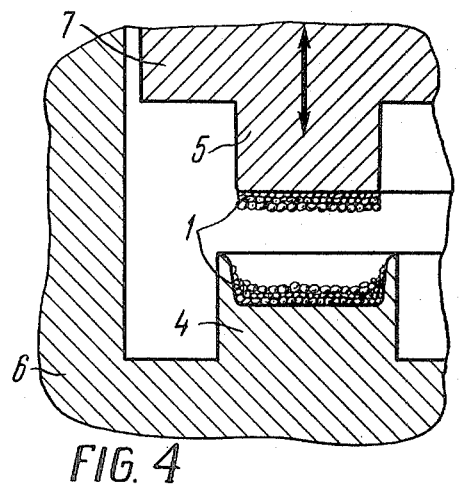
FIG. 4 is a longitudinal sectional view of a portion of locking device with a hermetically sealing layer formed on the contacting surfaces of the sealing members.

In accordance with another constructive embodiment of the present invention as shown in FIG. 4 the sealing bosses 4 and 5 of the seat 6 and the locking member 7, respectively, are provided with hermetically sealing layers 1 formed thereon in accordance with the afore-described method, each being capable of hermetic sealing of the sealing member without using any packing. If the hermetically sealing layer is made from a material different from that of the sealing bosses, the layer is preserved through mixing and mutual transfer of the material of the layer from one surface onto another, and vice versa.

The afore-described examples relate to cases when the present invention is used in sealing valve units. It is used somewhat differently in vacuum devices employed for hermetic sealing of vacuum from the atmosphere.

In such cases, for example, in large-size detachable flange connections, it is sometimes rather difficult or impossible to form a hermetic sealing layer directly on the sealing members of the joint (due to the atmosphere). Therefore, a packing with the hermetically sealing layer is made, separately in a vacuum in accordance with the same method and by means of an arramgement analogous to the sealing unit of a valve.

A packing that has been preliminary prepared in the afore-said manner can be repeatedly used in detachable connections, whereas conventional packings (having no hermetic sealing layer) can be used one time only.

In other cases, i.e. when the detachable device can be placed in a vacuum, the metallic hermetic sealing layer is formed not only on the packing but on the other sealing members as well.

Thus, the present invention provides for the formation, on the contacting surfaces of sealing members, of a metallic hermetic sealing layer possessing high hermetic sealing ability and long service life, complete restoration of its structure and properties during repeated use, a low specific force of hermetic sealing, a high mechanical strength, wear-resistance, and chemical and thermal resistance within a wide range of temperatures.

It is clear that the present invention may be attained and used in many other modifications and devices, and may have an arrangement different from those shown in the drawings, without deviating from the characteristic features of the invention.

Furthermore, it is evident that the method of forming a metallic hermetically sealing layer may be also utilized in a number of other modifications without deviating from its intended scope, i.e. the placing of sealing surfaces in a vacuum, their mutual compression up to a predetermined force of compression at an appropriate temperature, drawing-apart or separation of the contact surfaces and repetition of the process until a homogeneous hermetically sealing metallic layer of a required thickness is obtained.

What is claimed is:

1. A method of forming a sealing coating on metallic sealing members, said method comprising the steps of: compressing one sealing member against another sealing member in a vacuum; holding the members compressed until molecular diffusion of the metals of the members takes place; separating the members while continuously maintaining them in the vacuum, and repeating the above steps several times until there is formed on the contact surfaces of the sealing members a finely dispersed metallic layer caused by transfer of material from one member to the other, said finely dispersed metallic layer being formed of granules of irregular shape distributed throughout said layer, said metallic layer being formed with a thickness of 10–400 microns, said granules being formed of a size between 1 and 100 microns.

2. A method as claimed in claim 1 wherein the other member against which the first sealing member is compressed and separated is intended to form a seal with the first sealing member in a sealing device, the seal between the two members being formed by compressing the members together to obtain plastic intermixing of the layers thereof.

3. A method as claimed in claim 2 wherein the compression and separation is repeated until the sealing layers on the members are self-restoring in the course of subsequent sealing and unsealing operations.

4. A method as claimed in claim 3 wherein the first sealing member and the other member are of the same metal and constitute opposed sealing elements of the sealing device, one member being formed with a boss and the other with a groove to receive the boss, the sealing layers being formed at the bottom of the groove and the outer edge of the boss.

5. A method as claimed in claim 3 wherein the sealing layers are formed so as to be plastically deformable at substantially lower pressures as compared to the underlying metal of the corresponding member.

* * * * *